Patented Feb. 21, 1933

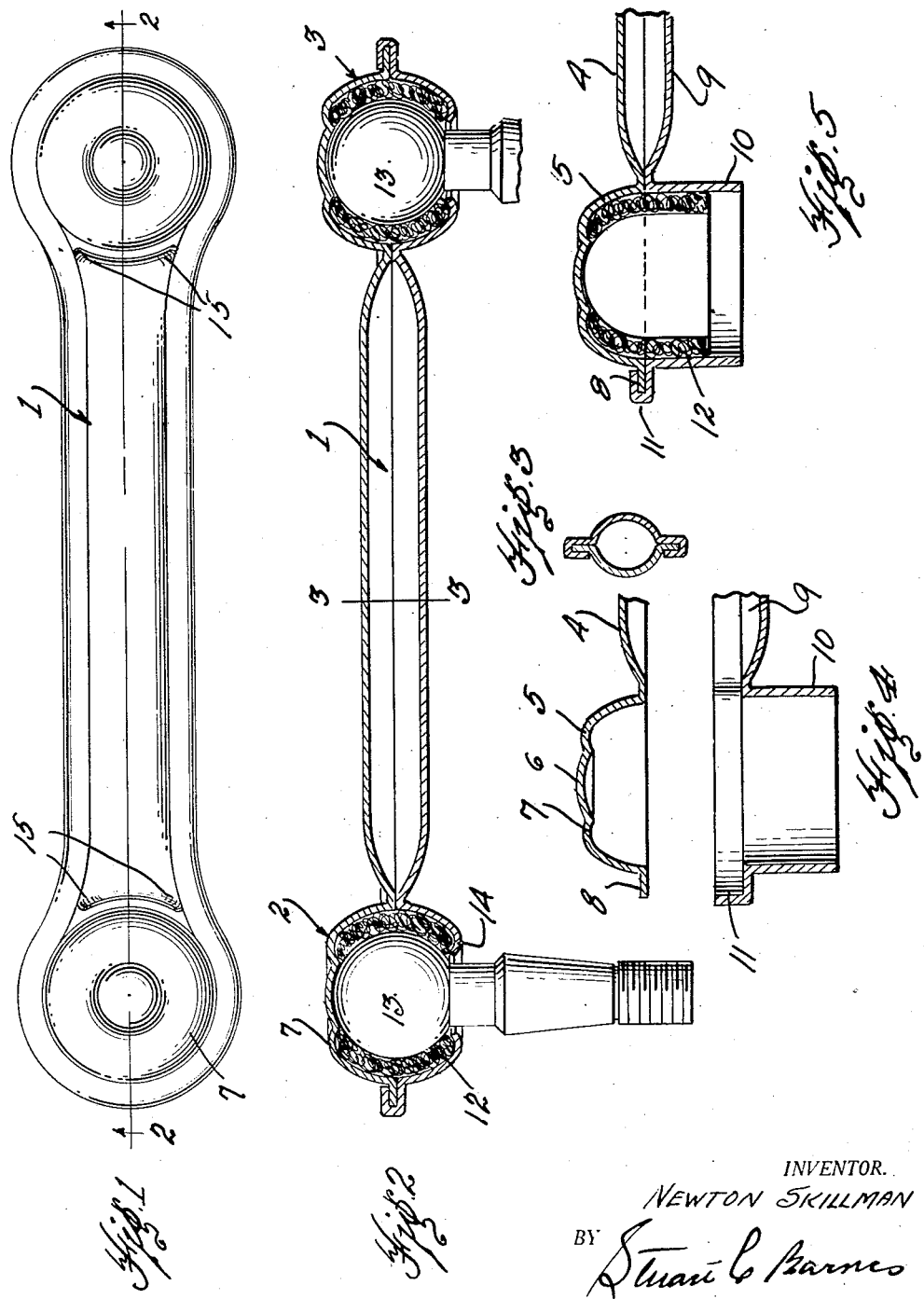

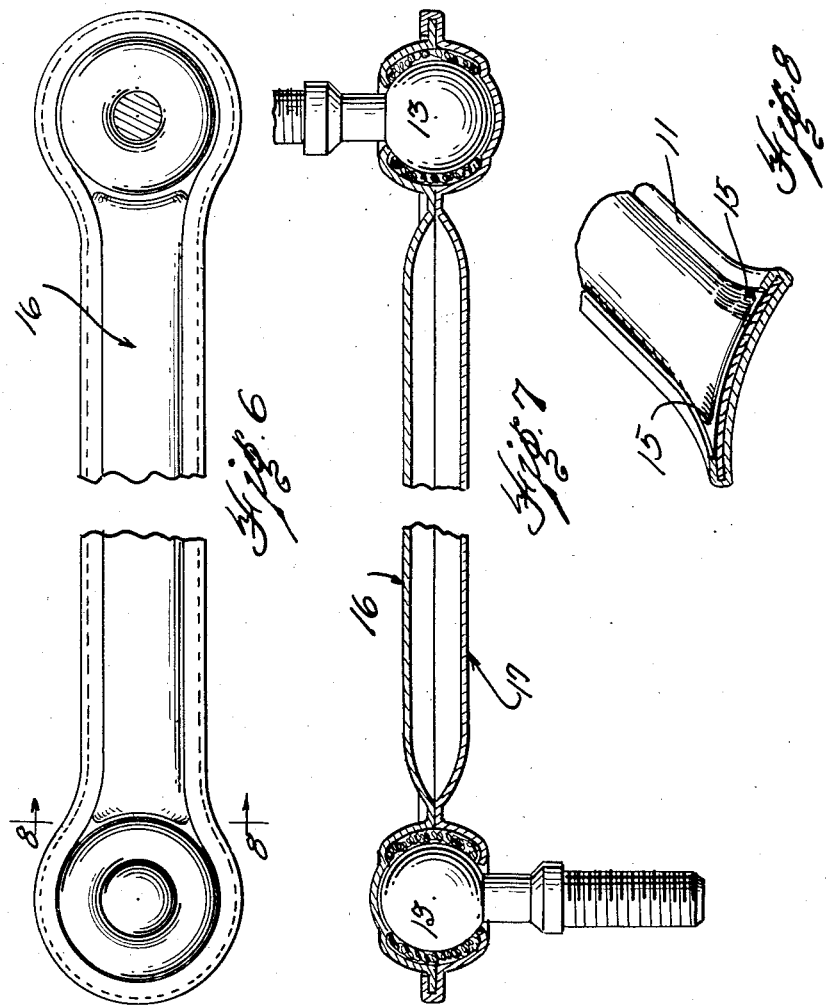

1,898,100

UNITED STATES PATENT OFFICE

NEWTON SKILLMAN, OF DETROIT, MICHIGAN, ASSIGNOR TO O. & S. BEARING COMPANY, OF DETROIT, MICHIGAN, A CORPORATION OF MICHIGAN

PERMANENT CONNECTING UNIT AND METHOD OF FORMING SAME

Application filed December 9, 1929. Serial No. 412,682.

This invention relates to a permanent connecting unit and method of forming same, and has to do particularly with a unit of the type having spaced ball joints and a connecting link therebetween.

In my pending application Serial No. 376,057, filed July 5, 1929, I have disclosed the broad idea of a permanent non-adjustable connecting link assembly wherein the ball joints are locked in position within a self-lubricating bushing of fibrous material by the distortion of a part of the bearing housing. It is the object of the present invention to provide a permanent link of this same general type but of a much stronger and simpler structure. More specifically, the present invention embodies a permanent connecting unit wherein the housings for the ball joints and the connecting or supporting link are formed integrally of the same piece of material. To make the unit still stronger, I preferably form the bearing housings in halves and the link in halves so that the half bearing housings and the half link are formed integrally in a single piece of material and then joined to form an integral unit.

Another important feature of the present invention resides in the method of assembly and particularly the method of assembling the ball joints in position, such method step residing in first forming the integral unit and then inserting the ball joints and distorting a portion of the bearing housing.

In the drawings:

Fig. 1 is a plan view of a completed unit embodying the present invention.

Fig. 2 is a longitudinal sectional view taken on line 2—2 of Fig. 1, showing the complete assembly as being formed in four parts; namely, the two ball joints and the two permanently joined halves which form the link and bearing housings.

Fig. 3 is a sectional view taken on line 3—3 of Fig. 2.

Fig. 4 is a fragmentary end view illustrating the preferred form of the two halves prior to assembly.

Fig. 5 is a view similar to Fig. 4 but showing the two halves permanently secured together and the bearing housing in shape to receive a ball joint.

Fig. 6 is a plan view of a slightly modified form of unit wherein the shanks of the ball joints project from opposite sides of the unit.

Fig. 7 is a longitudinal section taken through the structure shown in Fig. 6.

Fig. 8 is a perspective view taken on line 8—8 of Fig. 6 and illustrating the manner of embossing a portion of each half of the link adjacent the bearing housings.

In order to completely eliminate any looseness in the connecting unit either from manufacture or from shocks absorbed during operation, I preferably form the bearing housings and the connecting and supporting link integrally. In other words, referring particularly to Fig. 2, the connecting unit is formed generally of a link 1 and bearing housings 2 and 3. Each unit is formed integrally in that the two bearing housings and connecting link are formed in two halves.

Each half is preferably formed of a sheet metal stamping. In forming the unit shown in Fig. 2, one half is preferably formed from a single piece of metal to provide one portion 4 of the connecting link and a portion 5 of the housing. This portion 5 preferably has a portion of its surface substantially spherical in shape and the end of this portion 5 is preferably closed to provide a depression 6 and suitable shoulders 7. This half is also preferably provided with a lateral flange 8.

The other half of the unit is best shown in Fig. 4 wherein the portion 9 of the connecting unit is formed similarly to the portion 4 and wherein the portion 10 of the bearing housing which is adapted to register with the portion 5 of the other half is formed to present a substantially cylindrical open portion. It will be understood that I am in no way limited to the particular form of this open portion 10, but it is preferably of such size as to receive a bushing and ball member. This other half of the unit is also provided with what might be termed a depression or right angular flange 11 for receiving the flange 8.

In assembling the unit, the two halves are brought together and the flange 11 bent over to permanently secure the two halves together. An annular strip 12 of lubricant impregnated fibrous material may be then inserted within the open end 10 of the bearing housing, and a portion of this strip adjacent the half 5 of the bearing housing may be initially preformed and placed under compression by inserting one of the ball members 13.

While a portion of the bushing is thus held under compression, the cylindrical portion 10 is deformed so as to be given a substantially spherical shape as shown in Fig. 2, and at the same time to compress the other portion of the bushing 12 around the ball member 13, whereby to permanently lock and position the ball member in place.

It will be obvious that a unit may be formed merely by forming two complete halves, as shown in Fig. 2, whereby each bearing housing half is hemi-spherical in shape to start with and then secure the ball joints in place merely by bringing the two halves together and turning over the flanges. However, I find that the extra step of opening up one half 10 of the bearing housing and inserting the ball joint and bushing after the two halves are secured together is a better one because experiments have shown that distortion of one half of the housing makes it possible to more positively and securely place the bushing under compression and lock the ball joint into position. The forming of the bushing around the ball joint and the compression of the same is much more positive and satisfactory than when the bushing is compressed merely by the assembly of two semi-spherical halves. This is particularly true where the inner spherical member consists of a relatively fixed ball joint.

In deforming the portion 10 of the bearing housing, it is preferably formed as at 14 so as to provide a shoulder for the other end of the annular bushing. The link portions 4 and 9 are preferably embossed to form a connecting link of the cross sectional form shown in Fig. 3. This oval cross sectional shape is preferably carried out up to a point adjacent the bearing housings 2 and 3. At this point the corner portions 15 are also preferably embossed or struck out so as to materially strengthen the link at the point where it terminates in a bearing housing.

In Figs. 6 and 7 I have shown a slightly modified form of unit wherein the bearing housings are so formed as to contain oppositely disposed ball joints. In this case the complemental stampings which may be generally designated 16 and 17 are identical with the exception that one unit has a lateral flange and the other a depression which is formed into a surrounding flange for the lateral flange. The form of the embossed link in this modification is shown as being the same as the unit illustrated in Figs. 1, 2, and 3, but it will be understood that the two stampings 4 and 9 or 16 and 17 may be varied as to shape and cross sectional contour and still be so complementally formed as to constitute a permanent integral unit. In other words, the relative positions of the studs of the two ball members may be varied considerably either by reversing the opening in the bearing housing or by changing the shape of the complemental connecting links. The cross sectional shape of the complemental links may obviously be varied as desired and to suit any particular conditions.

It will thus be seen that I have provided a permanent, non-adjustable, self-lubricating unit of very simple but strong construction. The forming of the bearing housing halves and the connecting link halves from a single one piece stamping not only reduces the number of parts and cost of the unit, but materially increases the strength of the entire unit. The integral one piece construction also prevents any looseness between the link and the bearing housings, thus positively eliminating any rattles. It will also be obvious that my novel additional step of assembling the unit stamped halves before assembling the ball joints makes it possible to securely lock each ball joint in place and insure that the bushing is securely compressed in place.

What I claim is:

1. The method of forming a permanent connecting unit for shock absorbers and the like, which comprises integrally forming a link and spaced bearing housings in two longitudinal halves, complementally positioning the halves together to complete the bearing housings and the link, positioning ball joints within each housing, surrounding the ball joints with compressible expansible material, and permanently securing said halves together to form an integral unit and compressing said material by distorting a portion of the housings and link of one of the halves into locking relation with the other.

2. The method of forming a permanent connecting unit for shock absorbers and the like, of the type having spaced bearing housings and a connecting link, which comprises forming the bearing housings and the connecting link in two integral parts, complementally positioning the two parts together to form a hollow link and substantially spherical bearing housings for receiving ball joints and compressible expansible material and securing the two parts together to permanently lock the unit in assembled relation by distorting one of said parts to lock the other part in permanent complemental position.

3. The method of forming spaced non-adjustable connecting units for shock absorbers and the like, which comprises forming two stampings, each with a connecting unit and bearing housing, securing the stampings together to form a hollow link and oppositely positioned bearing housings, inserting a bushing formed of compressible expansible material within each housing, inserting a ball joint within each housing and within said material, and then locking each ball joint in position and positively compressing the bushing by distorting a portion of the wall of said bearing housings.

4. The method of forming permanent non-adjustable connecting units having spaced ball joints, which comprises forming two stampings each shaped to provide a portion of two spaced bearing housings and an integral connecting member, one or more of the bearing housings of each stamping being substantially semi-spherical in shape, securing the stampings together to complete the connecting unit and to register the bearing housing parts, the bearing housing part opposite said substantially semi-spherical part being open to receive a ball joint, positioning a bushing of lubricant impregnated fibrous material within each housing, positioning the ball joint within each housing, so as to be separated from the housing by the bushing, and then locking each ball joint in position and compressing the bushing against the same by distorting said open portion of the bearing housing.

5. The method of forming permanent non-adjustable connecting units for shock absorbers and the like of the type having spaced ball joints, which comprises forming spaced bearing housings and a connecting link of two longitudinal halves, each half being formed of a single stamping, complementally positioning said stampings together to complete the link and register the bearing housings, permanently securing the stampings together by turning over a portion of the edge of one unit into locking relation with the other unit, then inserting ball joints and a bushing of lubricant impregnated fibrous material within the bearing housings and distorting a portion of the wall thereof to compress the bushing against the ball joints and lock the ball joints in place.

6. A permanent, connecting unit assembly, comprising spaced ball joints, a bushing of expansible material surrounding each ball joint, and bearing housings formed of two halves permanently secured together and compressing the bushings around the ball joints, said housings being connected together by a link formed integrally therewith.

7. A connecting unit assembly, comprising spaced ball joints, a bushing of compressible material surrounding each ball joint, and bearing housings formed in two halves permanently secured together and compressing the bushing around the ball joints, each half being connected together by a link formed integrally therewith, each of said integrally formed bearing halves and connecting links being formed of a single stamping.

8. A permanent non-adjustable connecting unit assembly, comprising integrally connected and permanently spaced bearing housings, said housings and connecting means being formed of two complementally shaped stampings, ball joints within each bearing housing and having connecting studs protruding therefrom, each bearing housing being permanently formed to completely surround each ball joint up to a point closely adjacent said protruding portions, and a bushing of compressed material between each ball joint and its bearing housing.

9. A permanent, non-adjustable connecting unit comprising spaced ball joints, bushings of lubricant impregnated fibrous material annularly positioned around said ball joints and bearing housings surrounding and compressing said material and consisting of two halves substantially hemi-spherical in shape, two of said halves being connected together by a link which is formed integrally therewith.

10. A permanent, non-adjustable connecting unit comprising spaced ball joints, bushings of lubricant impregnated fibrous material annularly positoned around said ball joints, and bearing housings surrounding and compressing said material and consisting of two halves substantially hemi-spherical in shape, two of said halves being connected together by a link which is formed integrally therewith, said link and said halves being formed of a single stamping.

11. A permanent, non-adjustable connecting unit comprising spaced ball joints, bushings of lubricant impregnated fibrous material annularly positioned around said ball joints, spaced bearing housings surrrounding and compressing said material and consisting of two halves substantially hemi-spherical in shape, said halves being integrally connected together by complementally formed connecting portions, said halves and said connecting portions being each formed of single stampings.

12. A connecting unit assembly, comprising spaced ball joints, surrounding bushings of lubricant impregnated fibrous material, bearing housings formed in two substantially complemental halves, complementally shaped link portions integrally formed with the bearing housings, said bearing housings and links being permanently secured together and said bushings being compressed around said ball joints by walls of said bearing housing.

In testimony whereof I affix my signature.
NEWTON SKILLMAN.